June 24, 1958        A. C. BRYAN        2,839,940

CONTROL APPARATUS FOR CLUTCHING DEVICES

Filed Aug. 13, 1956

INVENTOR.
ARTIS C. BRYAN

BY *Woodling & Frost*
*Atty's.*

United States Patent Office 2,839,940
Patented June 24, 1958

2,839,940
CONTROL APPARATUS FOR CLUTCHING DEVICES

Artis C. Bryan, Syracuse, N. Y., assignor to Truckstell Manufacturing Company, a corporation of Ohio Application August 13, 1956, Serial No. 603,504

8 Claims. (Cl. 74—359)

My invention relates to control apparatus for controlling the operation of a plurality of clutches.

An object of my invention is to provide control apparatus for actuating a plurality of clutch members in which a first clutch member is positively actuated into clutching arrangement and a second clutch member is impostively actuated by resilient means triggered by actuation of the first clutch member so as to permit a time lag in the clutching of the second clutch member to accommodate the condition of the second clutch member.

Another object is the provision of means for controlling the actuation of a plurality of clutch members in such a way as to accommodate the resistance of one of the clutch members to clutching interengagement when the gear teeth of the clutch member are not in alignment.

Another object is to provide control means for actuating a plurality of clutch members in accordance with the requirements of the clutch members for actuation.

Another object is to provide means for accommodating the requirements of a clutch member which connects and disconnects a shaft from a source of power to the operating characteristics of a transmission mechanism.

Another object is the provision for obtaining flexibility and ease in operation of control apparatus for actuating a plurality of clutch members.

Other objects and a fuller understanding of my invention may be had by referring to the following description and claims, taken in conjunction with the accompanying drawing, in which:

Figure 1:
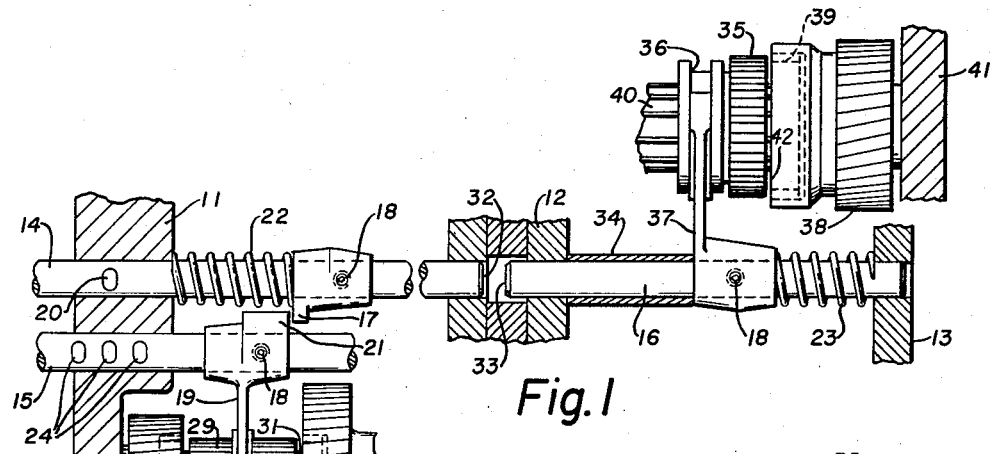
Figure 1 is a cross-sectional view of apparatus embodying my invention and showing the parts in one operation position.

As seen in the drawing, there are three substantially parallel supporting members 11, 12 and 13 which are spaced apart. A rod 14 is reciprocal in axially aligned openings in the supports 11 and 12. The rod 15 is reciprocal in an opening in support 11. A rod 16 is reciprocal in aligned openings in supports 12 and 13.

The rods 14 and 16 are in axial alignment with each other and are independent of each other, that is, they are not connected with each other. Rod 15 is disposed parallel to the axis of rods 14 and 16. The rod 14 has an abutting member 17 firmly secured thereto by means of a screw 18 so that the abutting member 17 reciprocates with the rod 14. A fork member 19 is secured to the rod 15 by means of a similar screw 18 so that the fork member 19 reciprocates with the rod 15. The fork member 19 has an abutting portion 21 which is in alignment with the abutting member 17. The disposition of the abutting member 17 and the abutting portion 21 is such that upon movement of the abutting portion 21 to the right, it engages and pushes the abutting member 17 to the right as viewed in Figure 1. Similarly, movement of the abutting member 17 to the left engages and pushes the abutting portion 21 to the left. Thus, movement of the rod 15 to the right causes movement of the rod 14 to the right. Also movement of the rod 14 to the left causes movement of the rod 15 to the left, by reason of the disposition of the parts 17 and 21.

A spring 22 abutting both the support 11 and the abutting member 17 resiliently urges the rod 14 to the right, that is, toward the rod 16.

A fork member 37 is carried by the rod 16 and secured thereto by a screw 18 so that the fork member 37 reciprocates with the rod 16. A spring 23 abutting the support 13 and the fork member 37 resiliently urges the rod 16 to the left, that is, toward the rod 14. A spacer sleeve 34 positioned between the support 12 and the fork member 37 provides a limit to movement of the fork member 37 to the left and hence a limit to the movement of the rod 16 to the left.

Detent means indicated by the detent socket 20 on the rod 14 is provided to retain the rod 14 in an inactive position when the rod 14 is withdrawn to its position shown in Figure 1, in which position a detent ball or plug resiliently pressed into socket 20 tends to hold the rod 14 in this withdrawn position. The detent action may be overcome by manual action so as to move the rod 14 to the right, notwithstanding the tendency of the detent ball to remain in the detent socket 20.

The rod 15 is provided with three detent sockets 24 spaced apart along one side of the rod 15. These detent sockets 24 are arranged to sequentially interengage with a detent ball or plug when the respective socket is in alignment with such a resiliently urged detent ball or plug.

To illustrate the use of my control apparatus, I show a pair of gear members 25 and 26 of a speed change transmission mechanism. Splined to a shaft 31 of the mechanism and disposed intermediate the gears 25 and 26 is a clutch member 29. This clutch member 29 has externally arranged gear teeth on both of its ends. It also has an annular groove 30 disposed intermediate its ends. The left-hand end of the clutch member 29 is adapted to interengage with internal gear teeth 28 of the gear 26. The right-hand end of the clutch member 29 is adapted to enmesh with the internal gear teeth 27 of the gear 25. By moving the clutch member 29 to the left, the shaft 31 becomes operatively engaged with the gear 26 upon which the clutch 29 is splined. By moving the clutch member 29 to the right, the gear 25 becomes operatively connected with the shaft 31 upon which the clutch member 29 is splined.

Inasmuch as the particular utilization of the invention in the embodiment here disclosed is directed to the shifting of the clutch member 29 in one operation, that is, toward and into engagement with the gear 25, only that particular operation is involved in the movement of the parts herein described in the practice of my invention.

The intermediate of the three detent sockets 24 corresponds to the neutral or intermediate position of the clutch member 29, which is the position illustrated in Figure 1. The left-hand detent socket of the three sockets 24 corresponds to the position of the clutch member 29 in its position when enmeshed with the gear 25, that is, the position shown in Figure 2. The right-hand detent socket of the three sockets 24 corresponds to the position of the clutch member 29 when it is moved to the left of its neutral position so as to interengage with the gear 26.

The right-hand end of the rod 14 has an end denoted by the reference character 32. The left-hand end of the rod 16 has an end denoted by the reference character 33. In the arrangement illustrated in Figure 1, these ends 32 and 33 are spaced apart. In the disposition of the parts illustrated in Figure 2, these ends 32 and 33 abut each other.

Figure 2:
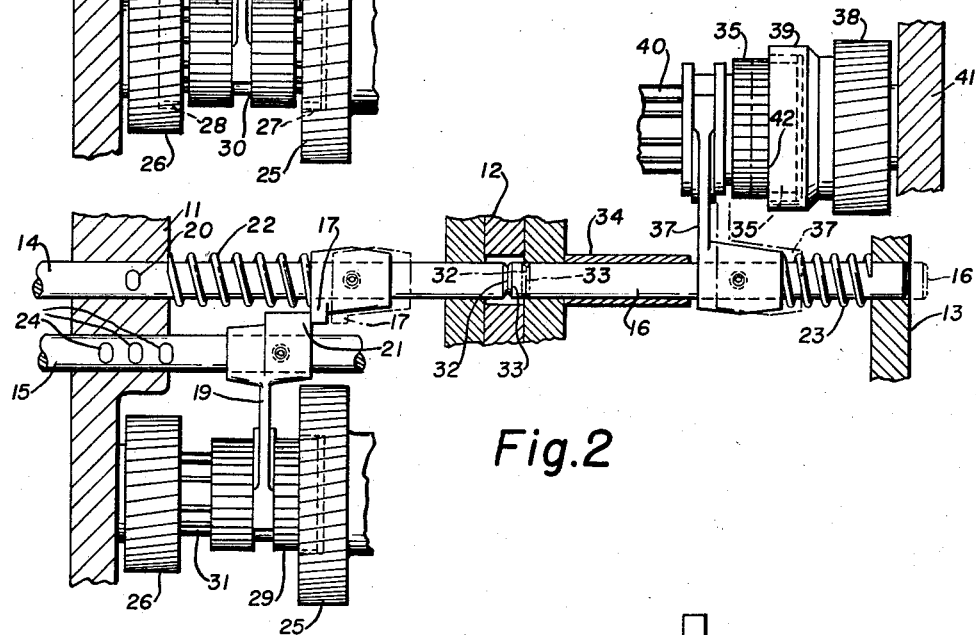
Figure 2 is a similar cross-sectional view of apparatus embodying my invention showing the parts in another operation position.

A shaft 40 carried by a support 41 has splined thereon a clutch member 35 so that the clutch member 35 rotates with the shaft 40. This clutch member 35 has an annular groove 36 which accommodates the arm of the fork member 37. Reciprocation of the fork member 37 moves the clutch member 35 axially along the shaft 40. The clutch member 35 has external gear teeth arranged at its right-hand end as seen in Figures 1 and 2.

A gear 38 is journaled on the shaft 40 so as to revolve therearound. This gear 38 has an internally gear-toothed portion 39 complementing the external gear teeth of the clutch member 35. Upon enmeshment of the teeth of the clutch member 35 with the internal gear-toothed portion 39 of the gear 38, then the gear 38 is operatively connected through the clutch 35 with the shaft 40 so as to rotate therewith. The gear 38 has a face or end wall 42 facing the clutch member 35. When the external teeth of the clutch member 35 and the internal teeth of the toothed portion 39 on the gear 38 are in proper alignment then the clutch member 35 may be readily moved to the right so as to enmesh with the gear-toothed portion 39. However, when the external teeth of the clutch member 35 are not in proper alignment so as to complementarily enmesh with the internal gear teeth of portion 39, then the clutch member 35 abuts against the face 42 and is held out of an enmeshment with the toothed portion 39 of the gear 38 by this end face 42.

By reason of the fact that the clutch member 35 in moving to the right will often and usually meet first the end face 42 before it is in correct alignment with the teeth of the portion 39, it is desired to permit a lag in the movement of the clutch 35 toward the gear 38. The resistance offered by the end face 42 to the clutch 35, when the complementary teeth of the clutch 35 and internally toothed portion 39 are not in correct alignment for an enmeshment, makes it undesirable to try to positively force by direct unyielding force the clutch member 35 toward the gear 38.

The shaft 40, clutch member 35 and gear 38, in the illustration given, are parts of a power divider wherein power derived from the transmission mechanism is delivered through a plurality of shafts, one of them being, for example, the shaft 40. There are also other uses and arrangements in which the clutching action described for the clutch member 35 and the gear 38 may be utilized and my invention used.

The rods 14 and 15 may be remotely manipulated, such as from the operator's cab of a truck. In the use of my invention as here described, the rod is remotely manipulated by an operator. Upon movement of the rod 15 to the right, the clutch member 29 is positively enmeshed with the gear 25. This action simultaneously moves the rod 14 to the right a sufficient distance to release the rod 14 from the detent ball or plug in the detent socket 20. As soon as the rod 14 is released from the detent, then the spring 22 resiliently urges the rod 14 to the right and toward the rod 16 to engage therewith. Upon the clutch member 35 meeting the end face 42 of the gear 38, the spring 22 yields until the teeth of the clutch 35 are in correct alignment with the internal teeth of the toothed portion 39 of the gear 38 and at that time the spring 22 moves the rod 16 to the right, thus carrying the clutch 35 into complete enmeshment with the internal teeth 39 of the gear 38.

Upon subsequent movement of the rod 15 to the left, such as back to the neutral position shown in Figure 1, then the rod 14 is not restrained by the interengagement of the abutting member 17 with the abutting portion 21. Upon manual movement of the rod 14 to the left so as to overcome the spring 22, the rod 14 is moved back to its inactive position shown in Figure 1 and is resiliently retained there by the detent ball in the detent socket 20. The spring 23, after the rod 14 is moved back to its inactive position, thereupon pushes the rod 16 and fork member 37 to the left, which in turn disengages the clutch member 35 from the internal toothed portion 39 of the gear 38. The spring 22 exerts a greater force to the right than does spring 23 to the left through their respective strokes. Fork member 37 is moved to the left by the spring 23 to where it is stopped by the spacer sleeve 34.

It is seen that by the arrangement illustrated and described, a lag in the enmeshment of the clutch 35 with the gear 38 is permitted so that in the same operation which positively enmeshes the clutch 29 with the gear 25, there is triggered an action which causes the enmeshment of the clutch 35 with the gear 38 but with an allowance of this lag required for proper alignment of the external teeth of the clutch 35 with the internal toothed portion 39 of the gear 38.

Figure 3:
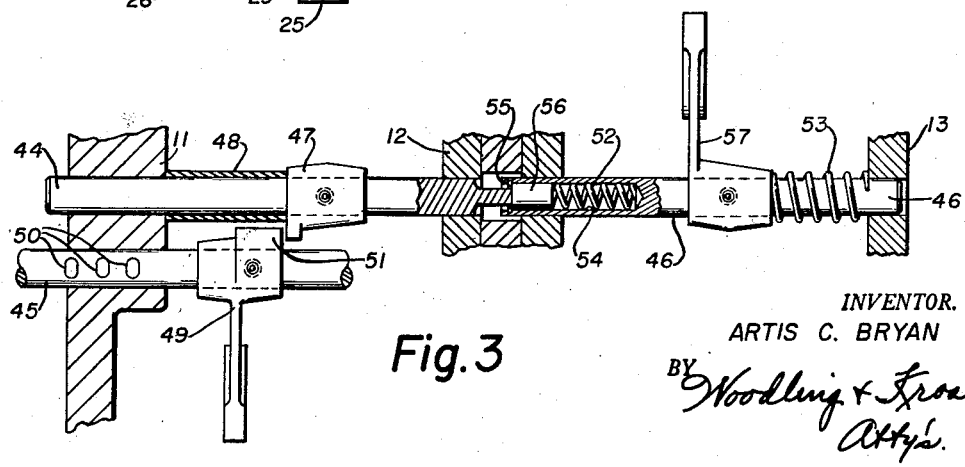
Figure 3 is a cross-sectional view illustrating a modified form of my invention.

In the modification illustrated in Figure 3, there are aligned rods 44 and 46 reciprocal in aligned openings in the supports 11, 12 and 13. In this modification, the rod 44 is not remotely operable as in the case of rod 14 in the illustrations of Figures 1 and 2. A rod 45 also carried by the opening in support 11 so as to be reciprocal therein is similar to the rod 15 shown in the form illustrated in Figures 1 and 2. This reciprocal rod 45 carries a fork member 49 which is adapted to shift a clutch member as was the fork member 19 carried by the rod 15 in the preferred embodiment of my invention.

The rod 44 has secured thereto so as to be carried thereby an abutting member 47. This abutting member 47 is aligned with an abutting portion 51 on the fork member 49. The relationship is similar to that of the abutting member 17 and the abutting portion 21 in the form illustrated in Figures 1 and 2, whereby movement of one against the other causes the other to move and to carry therewith the rod upon which it is secured. The rod 45 has three detent sockets 50 which are similar in construction and use to the detent sockets 24 on the rod 15 in the embodiment of Figures 1 and 2.

Positioned around the rod 44 is a spacer sleeve 48 disposed between the support 11 and the abutting member 47. This sleeve 48 provides a limit to movement toward the left of the rod 44 but permits the rod 44 to move to the right away from the support 11.

The rod 46 has secured thereto a fork member 57 so that the fork member 57 reciprocates with the rod 46. This fork 57 is adapted to shift a clutch member similarly to the manner in which the fork member 37 shifted the clutch 35 in the embodiment illustrated in Figures 1 and 2. A spring 53 positioned between the support 13 and the fork member 57 resiliently urges the fork member 57 and rod 46 toward the left.

The left-hand end of the rod 46 has a bore or hollow recess 54 provided therein. Positioned within this bore 54 is a coil pre-loaded spring 52 that is stiffer than spring 53. The right-hand end of the rod 44 is reduced to have a stem extended into the bore 54. A plug 56 of cylindrical form complementarily fits in bore 54. This plug 56 is slidably reciprocal in the bore 54 within the rod 46 and engages the end of the stem on rod 44. An end wall or washer 55 is provided to retain the plug 56 in the bore 54 and to form a limit stop for movement of the plug 56 toward the left and away from the rod 46.

In the embodiment illustrated in Figure 3, movement of the rod 45 to the right moves the rod 44 to the right and against the resilient action of the spring 52. When the clutch member 35 engaged by the fork member 57 meets the end face 42 of the gear 38, the fork member 57 does not move the clutch member 35 to the right. In this way, the movement to the right of the rod 44 is accommodated by the yielding of the coil spring 52 as the plug 56 moves against the spring 52. However, upon the external teeth of the clutch member 35 coming into alignment with the internal toothed portion 39 of the gear 38, then the resilient spring 52, being pre-loaded and stiffer than spring 53, immediately moves the rod 46, the fork member 57, and the clutch member 35 to the right for complete enmeshment of the clutch member 35 with the gear 38. Again, a lag in the clutching action between the clutch member 35 and the gear 38 is permitted by the imposition of resilient means between the positive forward movement of the rod 45 and the clutch 35.

When the rod 45 is moved to the left, such as to its neutral position, then the abutting portion 51 permits the abutting member 47 to move to the left and thus permits the rod 44 to move to the left to its position shown in Figure 3. This relieves the additional tension that was placed on spring 53 by the movement of rod 44 to the right and thereby the force holding the fork member 57 to the right is reduced. This permits the spring 53 to exert such a force as to move the fork 57 to the left and also to move the rod 46 to the left to its position shown in Figure 3. This disengages the clutch 35 carried by the fork 57 from the gear 38.

It is seen by the apparatus that has been illustrated and described that a flexible and convenient control arrangement has been provided for obtaining the results in an efficient and useful manner. The control apparatus is adaptable for different uses and may be rearranged to meet the requirements desired.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Control apparatus for axial shifting of a first toothed clutch member and a second toothed clutch member relative to first and second complementarily toothed gear members, respectively, for enmeshing and disenmeshing the complementary teeth of the respective clutch members and gear members, comprising a first longitudinally movable rod, first shifting means carried by said first rod for axially moving the first clutch member into and out of enmeshment with the first gear member, a second longitudinally movable rod disposed alongside of the first rod, said first and second rods having abutting portions disposed in opposition to each other so that movement of the first rod in an enmeshing direction moving the first shifting means to a position for enmeshment of the first clutch member with the first gear member interengages said abutting portions and moves said second rod in a first direction, a third longitudinally movable member positioned relative to the second rod to be moved by said second rod moving in said first direction, second shifting means carried by said third rod for axially moving the second clutch member into and out of engagement with said second gear member, a first spring urging the second rod in said first direction, detent means for restraining the first rod against the urging of said first spring, and a second spring urging said third rod in an opposite direction, movement of the third rod in said opposite direction moving the second shifting means to move the second clutch member to a position disengaged from said second gear member, said second and third rods being unconnected to permit the rods to move away from each other, the arrangement providing that movement of the first rod in said enmeshing direction moves the second rod in said first direction to overcome the said detent means and relative to said third rod, that resilient urging of the first spring moves the second rod a further distance to move said third rod and said second shifting means to enmesh the second clutch member and second gear upon the complementary teeth of the second toothed clutch member and second gear member coming into enmeshing alignment, the said second spring resiliently urging the third rod and second shifting means to disenmesh the second clutch member and second gear member upon movement of the second rod in said second direction.

2. The combination of a first reciprocal rod carrying means for actuating a first clutching device, a second reciprocal rod positioned relative to the first rod to be moved in one direction only by the first rod, a third reciprocal rod carrying means for actuating a second clutching device, said second clutching device being clutchable in one condition and not in another condition, said second and third rods being so positioned relative to each other that the third rod is moved in one direction only by the second rod, the movement of the third rod in said one direction tending to clutch the second clutchable member, a first spring urging the second rod in said one direction, detent means for restraining the second rod against the first spring in a withdrawn position away from said third rod, a second spring urging the third rod in said opposite direction toward said second rod, said second and third rods being spaced apart upon the second rod being in said withdrawn position and said third rod being in the position of its limit of movement in said one direction, the arrangement of the rods, springs and detent means being such that movement of the first rod to move the second rod in said one direction overcoming said detent means and moving the second rod against the third rod, that said first spring moves the second rod and third rod in said one direction upon said second clutching device reaching a said one condition, and said second spring moves the third rod in said opposite direction upon movement of the second rod in said opposite direction to said withdrawn position, the said movement of the third rod in said opposite direction upon movement of the second rod to said withdrawn position unclutching the second clutch member.

3. In control apparatus for clutching and declutching a plurality of gears with a plurality of axially shiftable clutch members, respectively, the combination of first actuating means for actuating a first clutch member in and out of clutching engagement with a first gear, second actuating means for actuating a second clutch member in and out of clutching engagement with a second gear, said second clutch member requiring a permissive lag in moving into clutching engagement with said second gear, a motion-transmitting member positioned in juxtaposition to said first actuating means and said second actuating means to be movable in one direction from an inactive position by the first actuating means being moved to actuate the first clutch member into clutching engagement with the first gear and to be movable in an opposite direction toward said inactive position upon movement of the first actuating means in an opposite direction, said motion-transmitting member being also positioned in juxtaposition to said second actuating means to be movable in said opposite direction toward said inactive position by the second actuating means upon the movement of the first actuating means to actuate the first clutch member out of clutching engagement with the first gear, detent means tending to retain the motion-transmitting member in said inactive position, a first spring urging the motion-transmitting member in said one direction, and a second spring urging said second actuating means in said opposite direction, movement of the first actuating means in the first direction overcoming the detent means and the first spring moving the motion-transmitting member to urge the second actuating means in said first direction, the resiliency of the first spring providing for said permissive lag, movement of the first actuating means and motion-transmitting member in said opposite direction overcoming said first spring to allow the second spring to move the second actuating means in said opposite direction, the second actuating means upon being moved in said opposite direction moving the motion-transmitting member to said inactive position.

4. Control means for actuating in sequence a first clutch member and a second clutch member and for permitting a lag in the actuation of the second clutch member upon actuating of the first clutch member, comprising in combination first actuating means for actuating the first clutch member, second actuating means for actuating the second clutch member, a motion-transmitting member positioned to be moved in one direction by the first actuating means upon movement of the first actuating means in said one direction and to be moved in an opposite direction by the second actuating means upon movement of the second actuating means in said opposite direction, first resilient biasing means urging the motion-transmitting member in said first direction, second resilient biasing means urging the second actuating means in said opposite direction, said second resilient biasing means having lesser resilient force than said first resilient biasing means, and detent means for tending to retain the motion-transmitting member in an inactive position withdrawn from said second actuating means, the movement of the first actuating means in said first direction moving the motion-transmitting member in said first direction to overcome the detent means and the first biasing means moving the motion-transmitting member toward the second actuating means, the resiliency of said first biasing means accommodating the permissive lag in actuation of said second clutch member by the second actuating means, movement of the first actuating means and motion-transmitting member in said opposite direction allowing said second biasing means to move the second actuating means in said opposite direction to said inactive position.

5. Control means for actuating in sequence a first clutch member and a second clutch member and for permitting a lag in the actuation of the second clutch member upon actuation of the first clutch member, comprising in combination a first actuating member for actuating the first clutch member, a second actuating member for actuating the second clutch member, a motion-transmitting member disposed to transmit motion in a first direction from the first actuating member to the second actuating member and disposed to be movable in an opposite direction upon movement of the first actuating means in said opposite direction, a first spring urging the motion-transmitting member in said first direction to move the second actuating member, and a second spring urging the second actuating member in said opposite direction, said second spring being adapted to move the second actuating member in said opposite direction upon movement of the first actuating member and motion-transmitting member in said opposite direction.

6. In control apparatus, first and second separable and aligned rods resiliently urged toward each other by first and second springs, said second spring urging the second rod toward the first rod and having lesser resilient force than said first spring, a clutch actuating member carried by the second of said rods, a movable member positioned in juxtaposition to said first rod, said movable member and said first rod having opposed abuttable surfaces so disposed that movement of the movable member in a first direction moves the first rod in said first direction and movement of the first rod in an opposite direction is permitted upon movement of the movable member in an opposite direction, said second spring moving the second rod toward the first rod to move the clutch actuating member in said opposite direction upon said movement of the movable member to permit the first rod to move in said opposite direction and thereby reduce the force of the first spring and the urging by the first spring of the rods toward each other.

7. In control apparatus having first clutch means and second clutch means, the combination of positive actuating means for direct actuation of the first clutch means, of resilient impositive actuating means actuated by the positive actuating means and disposed for yieldable actuation to clutched condition of the second clutch means, and spring means disposed to oppose the resilient impositive actuating means and to move the second clutch means to provide an unclutched condition of the second clutch means upon movement of the positive actuating means to provide an unclutched condition of the first clutch means, said movement of the positive actuating means reducing the opposition of the resilient impositive actuating means to said spring means.

8. The combination of a first movable member, a second movable member and a third movable member so disposed relative to each other that movement of the first member in a first direction moves the second member to a position at a first distance in said first direction, said first member opposing movement of the second member in an opposite direction from said position until said first member is moved in said opposite direction, first resilient means operatively disposed to move the third member relative to the second member a second distance in said first direction, and a second resilient means operatively disposed to move the third member relative to the second member in an opposite direction, said second resilient means having a resilient force sufficient to move the said third movable member in said opposite direction upon movement of the first member in said opposite direction sufficiently to permit movement of the second member in said opposite direction, the movement of the second member in said opposite direction reducing the force of the first resilient means urging the third member in said first direction and to thereby allow the second resilient means to move the third movable member in said opposite direction.

References Cited in the file of this patent

UNITED STATES PATENTS 2,225,493    Barnes _____ Dec. 17, 1940